United States Patent
Yun et al.

[11] Patent Number: 6,011,931
[45] Date of Patent: *Jan. 4, 2000

[54] APPARATUS AND METHOD FOR PREVENTING MAGNETIC RECORDING ERRORS IN AN ADVANCED PHOTO SYSTEM CAMERA

[75] Inventors: Tae-Kyung Yun; Byung-Su Kim, both of Kyeongsangnam-do, Rep. of Korea

[73] Assignee: Samsung Aerospace Industries, Ltd., Kyeongsangnam-do, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/877,210

[22] Filed: Jun. 17, 1997

[30] Foreign Application Priority Data

Jun. 28, 1996 [KR] Rep. of Korea ............ 96-24928

[51] Int. Cl.[7] .................................................. G03B 17/24
[52] U.S. Cl. ................................ 396/319; 396/409
[58] Field of Search ................ 396/319, 320–387, 396/392, 406, 310, 400

[56] References Cited

U.S. PATENT DOCUMENTS

| | | | |
|---|---|---|---|
| 5,614,969 | 3/1997 | Izukawa | 396/319 |
| 5,729,778 | 3/1998 | Sasaki | 396/319 |

*Primary Examiner*—Safet Metjahic
*Assistant Examiner*—Michael Dalakis
*Attorney, Agent, or Firm*—Finnegan, Henderson, Farabow, Garrett & Dunner, L.L.P.

[57] ABSTRACT

An apparatuses for preventing magnetic recording errors in an advanced photo system camera. The apparatus comprises a film transport sensing unit for detecting a perforation in a film and for generating an output signal for each detected perforation. A control unit determines whether noise has occurred in the transport sensing unit output signal while the film is being advanced. When noise occurs in the transport sensing unit output signal, the control unit prevents recording of photographic data on the film for a predetermined period of time. The apparatus also includes a magnetic recording unit for magnetically recording the photographic data on the film according to a control signal output by the control unit.

20 Claims, 6 Drawing Sheets

UNEXPOSED

PARTIALLY EXPOSED

EXPOSED

PROCESSED

APPARATUS AND METHOD FOR PREVENTING MAGNETIC RECORDING ERRORS IN AN ADVANCED PHOTO SYSTEM CAMERA

BACKGROUND OF THE INVENTION

A. Field of the Invention

The present invention relates to an apparatus and a method for preventing errors during magnetic recording in an advanced photo system (APS) camera, and more particularly, to an apparatus and a method for preventing magnetic recording errors caused by chattering noise.

B. Description of the Related Art

APS cameras have been recently developed which record information, such as film sensitivity and film type, on a data disk contained in a film cartridge. An APS camera can also recognize the state of the film by detecting the angular position of the data disk. As shown in FIGS. 8(a)–8(d), the film state may be either an unexposed state, a partially exposed state, an exposed state, or a processed state. Further, the film used in an APS camera has magnetic tracks in which photographic data, including a F-number and a shutter speed, can be magnetically recorded while the film is being advanced or transported.

Typically, two perforations are formed in a leading end portion and in a trailing end portion of each film frame. The APS camera includes a film transport sensing device established for sensing movement of the film by sensing the perforations in the film. The photographic data is then recorded on the magnetic tracks of the exposed frame during movement of the film. Noise, such as chattering noise, arises because of either the inferiority of the film, a mechanical fault, or a spatial complexity. This noise interferes with an output signal which represents the movement of the film, and, consequently, causes magnetic recording errors on the magnetic tracks.

SUMMARY OF THE INVENTION

Accordingly, apparatus and methods consistent with the present invention substantially obviate one or more of the problems due to limitations, shortcomings, and disadvantages of the related art by preventing magnetic recording errors due to chattering noise.

An apparatus, consistent with the present invention, for preventing magnetic recording errors in an advanced photo system camera, comprises a film transport sensing unit for detecting a perforation in a film and for generating an output signal for each detected perforation. A control unit determines whether noise has occurred in the transport sensing unit output signal while the film is being advanced. When noise occurs in the transport sensing unit output signal, the control unit prevents recording of photographic data on the film for a predetermined period of time. The apparatus also includes a magnetic recording unit for magnetically recording the photographic data on the film according to a control signal output by the control unit.

A method, consistent with the present invention, for preventing magnetic recording errors in an advanced photo system camera, comprises the step of advancing an exposed frame of a film. Each frame of the film includes a perforation. Next, it is determined whether noise occurs in a sensing signal representing the detection of a perforation. Finally, recording of photographic data on an exposed frame is prevented for a predetermined period of time when noise occurs in the sensing signal.

BRIEF DESCRIPTION OF THE DRAWINGS

The accompanying drawings, which are incorporated in and constitute a part of this specification, illustrate embodiments of the invention and, together with the detailed description, serve to explain the principles of the invention. In the drawings.

DETAILED DESCRIPTION

Embodiments of the present invention will now be described with reference to the accompanying drawings.

Figure 1:
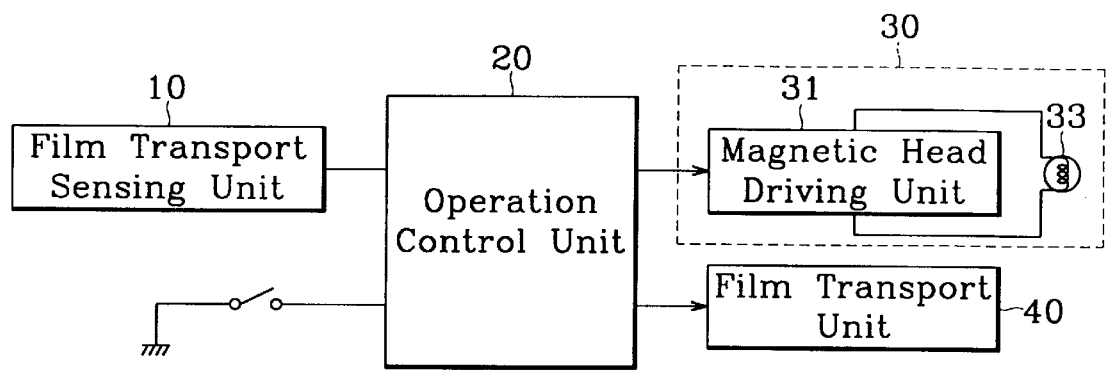
FIG. 1 is a block diagram of an apparatus for preventing magnetic recording errors in an APS camera in accordance with a preferred embodiment of the present invention.

Referring to FIG. 1, an apparatus for preventing magnetic recording errors in an advanced photo system camera includes a chamber switch S1 for sensing whether a chamber door 1 (see FIG. 7) is open or closed. A film transport sensing unit 10 detects perforations in the film and generates a sensing signal for each detected perforation. An operation control unit 20 generates a magnetic recording operation signal, after chamber switch S1 indicates that chamber door 1 is closed, according to the sensing signal output from the film transport sensing unit 10. Operation control unit 20 also generates a transport signal for advancing the film. A magnetic recording unit 30 magnetically records photographic data on the film based on the recording signal output from operation control unit 20. The apparatus further comprises a film transport unit 40 for advancing successive film frames according to the transport signal output from the operation control unit 20.

Figure 3:
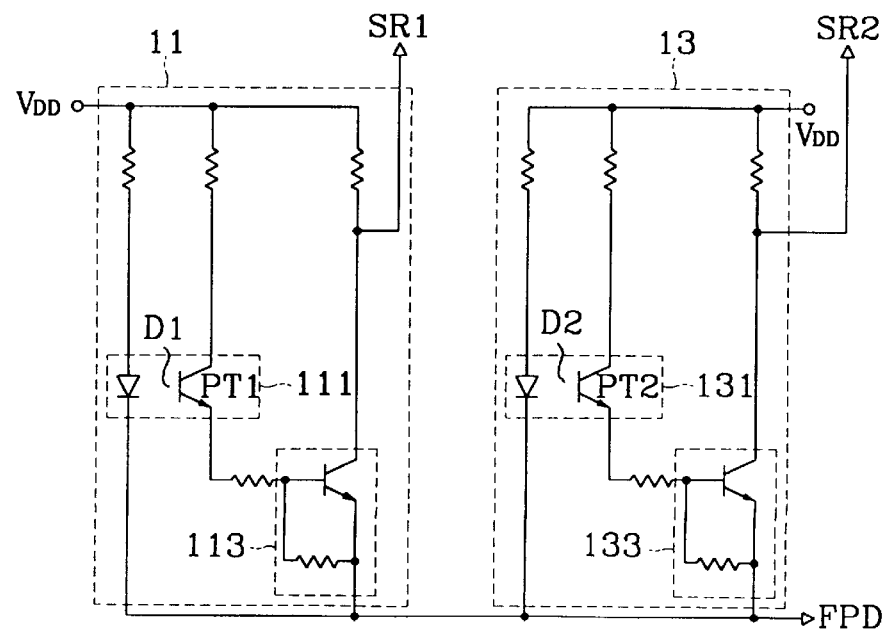
FIG. 3 is a detailed diagram showing the circuit of a film transport sensing unit of FIG. 1.
Figure 4:
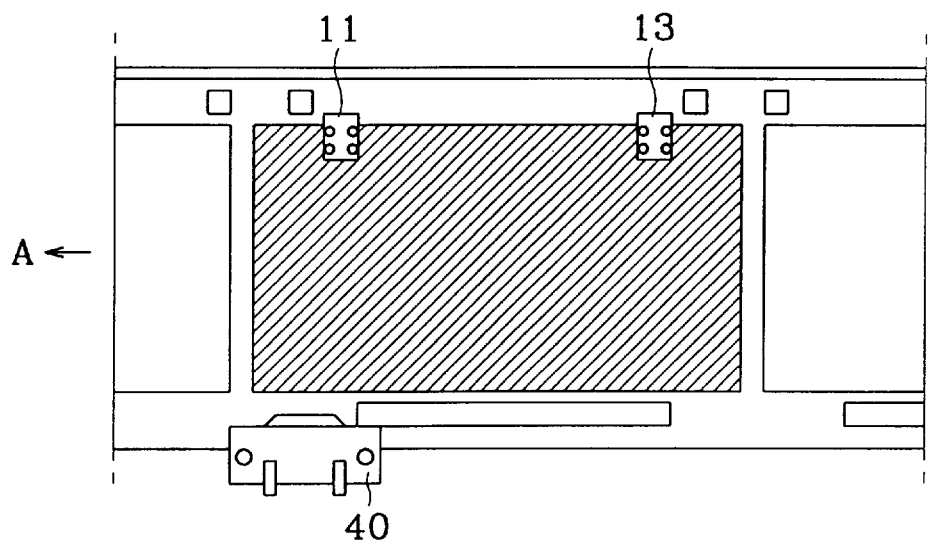
FIG. 4 is a perspective view of a film transport sensing unit provided for sensing the film transport.

As shown in FIG. 4, film transport sensing unit 40 is provided on the side of the film having magnetic material (the other side of the film is the side that is exposed during a photographic operation). Transport sensing unit 40 comprises a first sensing unit 11 and a second sensing unit 13, each located where the perforations are formed. Referring to FIG. 3, first sensing unit 11 and second sensing unit 13 each comprise an optical sensor. Sensing units 11 and 13 include respective photocouplers 111 and 131 each having a light emitting diode (LED) D1, D2 and a phototransistor PT1, PT2. Sensing units 11 and 13 further comprise respective signal generating units 113 and 133 for generating an electric signal on the basis of the signal output by photocouplers 111 and 131.

Referring back to FIG. 1, magnetic recording unit 30 includes a magnetic head 33 for magnetically recording the photographic data on the magnetic material of the film, and a magnetic head driving unit 31 for driving magnetic head 33 according to the recording signal output from operation control unit 20.

Figure 7:
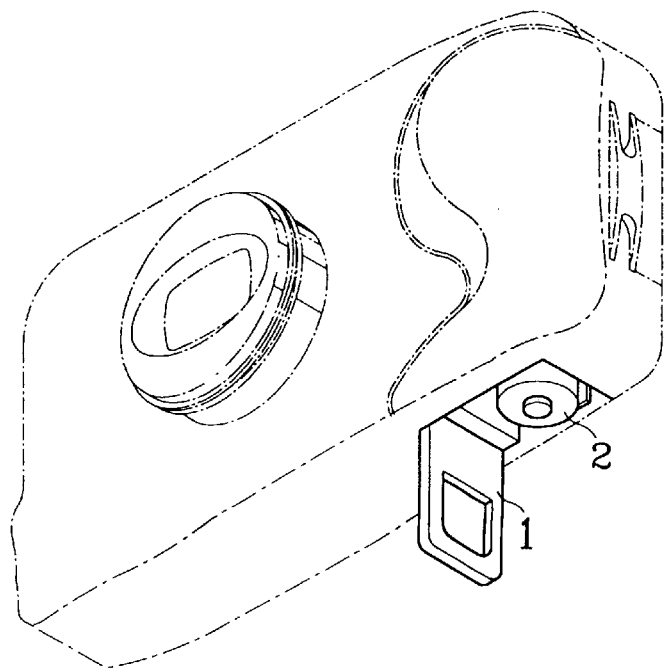
FIG. 7 is a perspective view of an APS camera, in which a film cartridge is loaded.
Figure 8A:
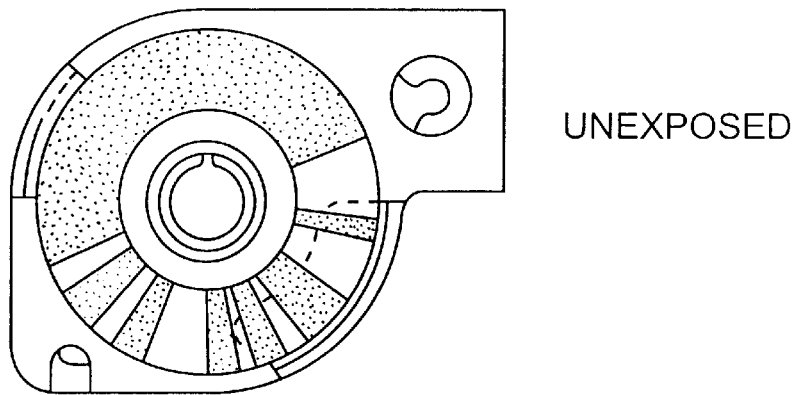
FIGS. 8(a)–8(d) shows the state of the film according to the rotation of the data disk in a APS film cartridge.
Figure 8B:
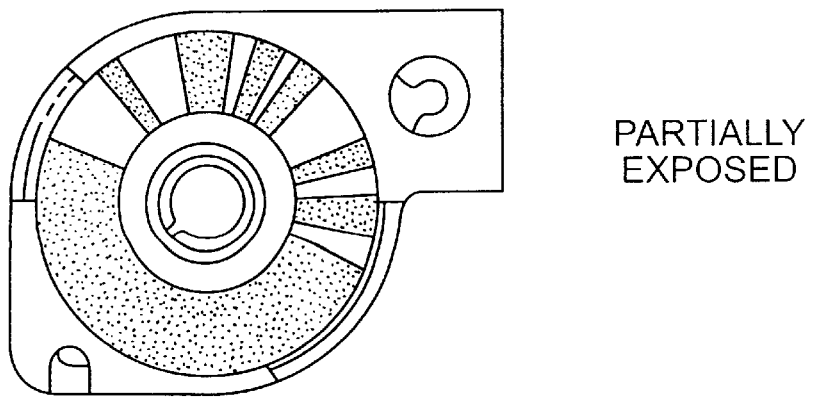
Figure 8C:
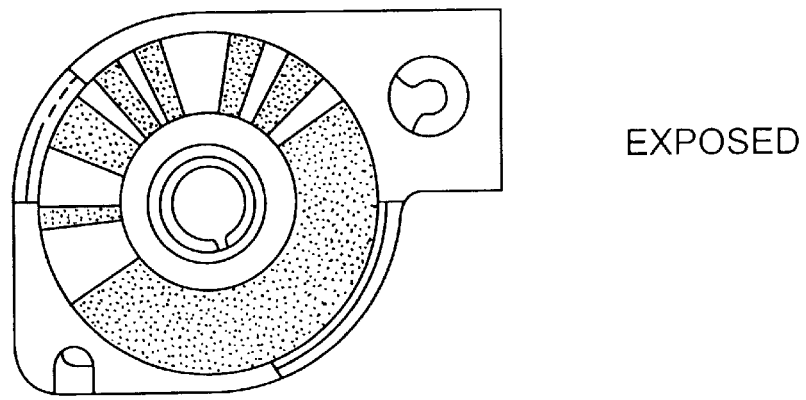
Figure 8D:
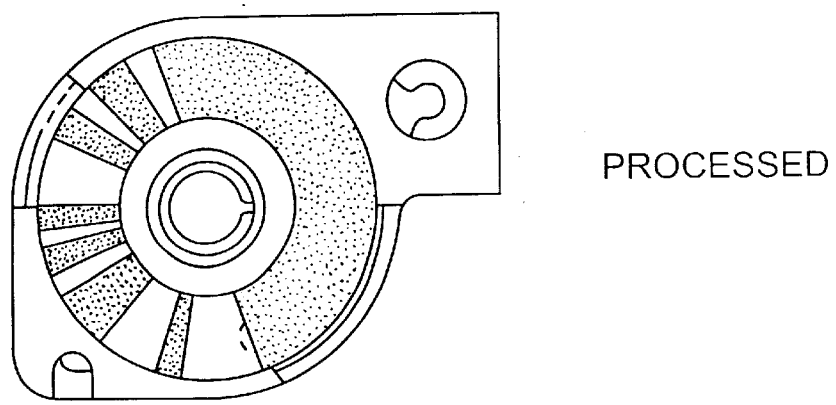

As shown in FIG. 7, the chamber switch S1 is hinged on the bottom plane of the camera and turns on when chamber door 1 is closed. Operation control unit 20 will then control an exposure operation after chamber switch S1 turns on, and generate a transport signal in order to advance the exposed frame. Film transport unit 40 then advances the exposed frame according to the transport signal. While the frame is being advanced, film transport sensing unit 10 detects a perforation in the film and generates a sensing signal for indicating each detected perforation.

On the basis of the sensing signal output from film transport sensing unit 10, operation control unit 20 executes a process for preventing magnetic recording error. Specifically, this process is executed after the exposed frame is advanced in the direction A (see FIG. 4) and after second sensing unit 13 generates a perforation sensing signal SR2 which changes from a high level to a low level as shown in FIG. 5.

Figure 2:
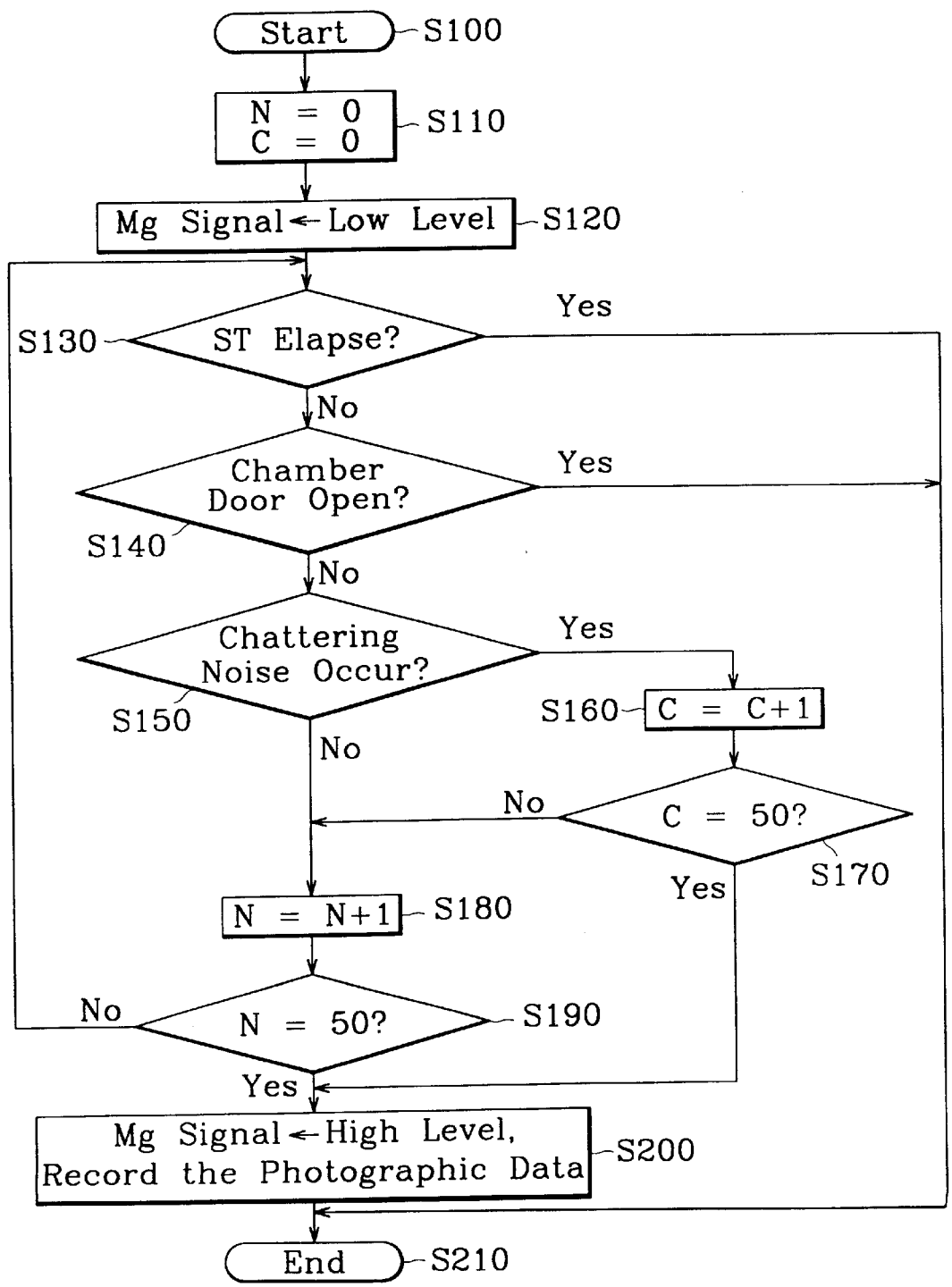
FIG. 2 is a flowchart showing the operation for preventing magnetic recording errors in an APS camera in accordance with a preferred embodiment of the present invention.

The operation of the operation control unit 20 will now be explained with reference to FIG. 2. The operation begins at step S100. At step S110, the operation control unit 20 initializes a chattering counter C and a loop counter N. Chattering counter C counts the occurrences of chattering noise and loop counter N counts the number of times a loop has been repeatedly executed.

Figure 5:
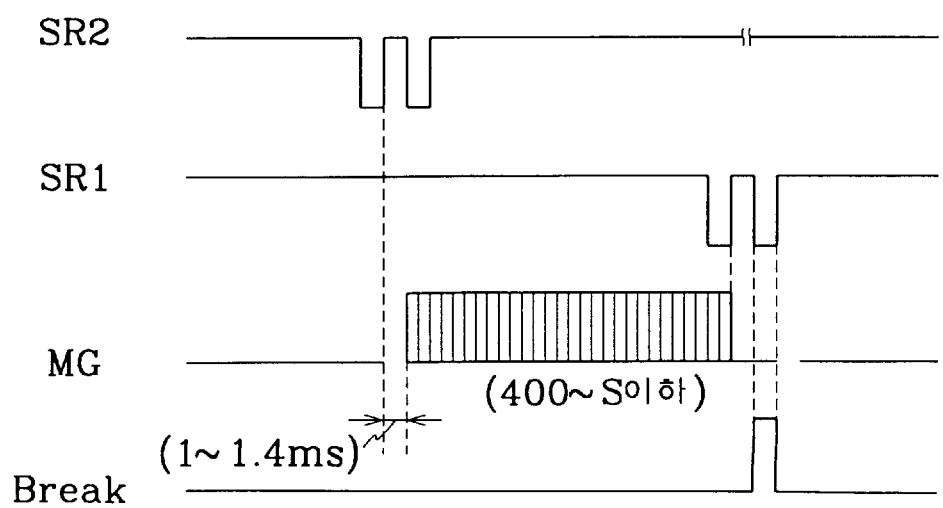
FIG. 5 is a time chart for an operation of the apparatus of FIG. 1.

Next, at step S120, operation control unit 20 generates a magnetic driving signal MG having a low level, as shown in FIG. 5. While the magnetic driving signal MG is low, magnetic head 33 does not record any data on the exposed frame.

Magnetic recording errors generally occur while the film is first advanced and, thus, in that portion of the film referred to as an initial magnetic recording portion. The time it takes for the initial magnetic recording portion to pass magnetic head 33 is referred to as the setup time ST. At step S130, the apparatus determines whether the setup time ST has elapsed. If the setup time ST has not elapsed, the operation proceeds to step S140 where the apparatus determines whether the chamber door 1 is open. If the setup time ST has elapsed or if the chamber door 1 is open, the operation proceeds to step S210 where the operation ends. If the chamber door 1 is closed, the operation then proceeds to step S150 where it is determined whether chattering noise has occurred. Namely, the apparatus determines whether the level of the signal SR2 output from second sensing unit 13 has changed.

If no chattering noise occurs, loop counter N is increased by one at step S180. However, if chattering does occur, the operation proceeds to step S160 where chattering counter C is increased by one. Then, at step S170, it is determined whether chattering counter C has reached a predetermined value. The predetermined value relates to the setup time ST and is preferably fifty (50). When the chattering counter C has reached 50, it means that magnetic head 33 is no longer in the initial magnetic recording portion. If the chattering counter C is not 50, the operation proceeds to step S180 where the loop counter N is increased by one. However, if the chattering counter C is 50, the operation proceeds to step S200.

At step S190, the apparatus determines whether the value of the loop counter N has reached a predetermined value, also preferably equal to fifty (50). If the loop counter N is not 50, that is if the magnetic head 33 is still in the initial magnetic recording portion, the operation proceeds to step S130 where it is determined whether the setup time ST elapsed. If the loop counter N is 50, the operation proceeds to step S200. When the loop counter N has reached 50, magnetic head 33 is no longer in the initial magnetic recording portion. While the magnetic head 33 is in the initial magnetic recording portion, the photographic data is not recorded on the frame.

Here, it takes about 1 msec for the loop counter N to reach 50 when chattering noise does not occur, depending on the film transport speed. Also, it takes about 1.15 msec for the loop counter N to reach 50 when the number of occurrences for chattering noise are less than 50, depending upon the film transport speed. Further, when the number of the occurrences for chattering noise reaches 50, the photographic data is not recorded during the first 1.4 msec.

Figure 6:
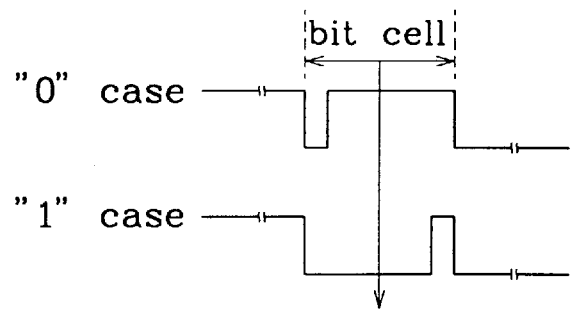
FIG. 6 is a time chart for a magnetic recording signal in accordance with a preferred embodiment of the present invention.

Next, at step S200, operation control unit 20 changes the magnetic driving signal MG from the low level to a high level. According to the magnetic driving signal MG, magnetic head driving unit 31 drives magnetic head 33 to record the photograph data on the frame while the frame is advanced. Here, the photographic data is recorded in binary format (i.e., such as 10110011). Each binary data is initially recorded as a low level for a specific period of time, as shown in FIG. 6, to indicate whether it is a 0 or a 1. In addition, low level data is recorded on the frame when the film is first advanced so as to relatively define where the magnetic recording will begin.

As described above, since the photographic data is not recorded on the exposed frame during an initial magnetic recording portion, the magnetic recording errors due to chattering noise can be prevented. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. An apparatus for preventing magnetic recording errors in an advanced photo system camera using film having magnetic material on one side, comprising:

film transport sensing means provided on the side of the film having magnetic material for detecting a perforation in a film and for generating an output signal for each detected perforation, wherein the film transport sensing means includes a first sensing unit for detecting a perforation in a leading end portion of the film and for generating a first sensing signal for indicating each detected perforation and a second sensing unit for detecting a perforation in a trailing end portion of the film and for generating a second sensing signal for indicating each detected perforation;

control means for outputting a control signal and for determining whether noise has occurred in the transport sensing means output signal while the film is being advanced, and, when noise occurs in the transport sensing means output signal, the control means delaying the enablement of the control signal for a predetermined period of time, wherein the control means includes a means for determining whether a level of the second sensing signal has changed, said change being indicative of noise, a means for initializing counters when the level of the second sensing signal has changed, a means for determining whether a level of the first sensing signal has changed, and means for determining whether noise has occurred in the first sensing signal when the level of the first sensing signal has changed; and magnetic recording means for magnetically recording the photographic data on the film when the control signal is enabled and preventing recording of photographic data on the film.

2. The apparatus of claim 1, wherein the film transport sensing means is provided on the side of the film having magnetic material, and wherein the film transport sensing means further includes:

a first sensing unit for detecting a perforation in a leading end portion of the film and for generating a first sensing signal for indicating each detected perforation; and a second sensing unit for detecting a perforation in a trailing end portion of the film and for generating a second sensing signal for indicating each detected perforation.

3. The apparatus of claim 2, the control means further including:

means for determining whether a level of the second sensing signal has changed;

means for initializing counters when the level of the second sensing signal has changed;

means for determining whether a level of the first sensing signal has changed; and means for determining whether noise has occurred in the first sensing signal when the level of the first sensing signal has changed.

4. The apparatus of claim 3, the control means further including:

a process loop;

a first counter for counting the number of times the process loop has been executed when noise does not occur in the first sensing signal; and wherein the control means outputs a recording signal to record the photographic data on an exposed frame when the first counter reaches a first predetermined counter value.

5. The apparatus of claim 3, the control means further including:

a first counter for counting repeatedly executed loops when noise does not occur in the first sensing signal;

means for outputting a recording signal to record the photographic data on an exposed frame when the first counter reaches a first predetermined value; and a second counter for counting the occurrences of noise in the first sensing signal, wherein the first counter incrementally counts the repeatedly executed loops while the value of the second counter is less than a second predetermined value.

6. The apparatus of claim 4, the control means further including:

means for preventing recording of photographic data on the exposed frame for a first period of time when noise does not occur in the first sensing signal;and means for preventing recording of photographic data on the exposed frame for a second period of time when noise does occur in the first sensing signal, and wherein the first period of time is less than the second period of time.

7. The apparatus of claim 5, the control means further including:

means for preventing recording of photographic data on the exposed frame for a first period of time when noise does not occur in the first sensing signal; and means for preventing recording of photographic data on the exposed frame for a second period of time when noise does occur in the first sensing signal, and wherein the first period of time is less than the second period of time.

8. The apparatus of claim 6, wherein the first period of time is equal to 1 msec, and the second period of time is equal to 1.15 msec.

9. The apparatus of claim 7, wherein the first period of time is equal to 1 msec, and the second period of time is equal to 1.15 msec.

10. The apparatus of claim 1, further comprising chamber sensing means for determining whether a chamber door is open.

11. The apparatus of claim 10, the control means further including:

means for determining whether the chamber door is open according to the determination made by the chamber sensing means; and means for preventing recording of photographic data on an exposed frame when the chamber door is open.

12. A method for preventing magnetic recording errors in an advanced photo system camera, comprising the steps of:

advancing an exposed frame of a film, wherein each frame of the film includes a perforation;

determining whether noise occurs in a sensing signal representing the detection of a perforation; and preventing recording of photographic data on an exposed frame for a predetermined period of time when noise occurs in the sensing signal.

13. The method of claim 12, wherein the determining step includes the substeps of:

determining whether the film is being advanced; and determining that noise has occurred when a level of the sensing signal has changed.

14. The method of claim 12, wherein the step of preventing the recording of photographic data includes the substeps of:

performing a process loop;

when noise has not occurred in the sensing signal, incrementing a first counter to count the number of times the process loop has been executed; and recording photographic data on the exposed frame when the first counter reaches a first predetermined value.

15. The method of claim 12, wherein the step of preventing the recording of photographic data includes the substeps of:

performing a process loop;

incrementing a first counter to count the number of times the process loop has been executed;

incrementing a second counter to count the occurrence of noise in the sensing signal;

recording photographic data on the exposed frame then the first counter reaches a first predetermined value;

wherein the first counter is incremented while the second counter is less than a second predetermined value.

16. The method of claim 14, further including the steps of:

preventing recording of photographic data on the exposed frame for a first period of time when noise does not occur in the first sensing signal;

preventing recording of photographic data on the exposed frame for a second period of time when noise does occur in the first sensing signal, and wherein the first period of time is less than the second period of time.

17. The method of claim 15, further including the steps of:

preventing recording of photographic data on the exposed frame for a first period of time when noise does not occur in the first sensing signal;

preventing recording of photographic data on the exposed frame for a second period of time when noise does occur in the first sensing signal, and wherein the first period of time is less than the second period of time.

18. The method of claim 16, wherein the first period of time is equal to 1 msec, and the second period of time is equal to 1.15 msec.

19. The method of claim 17, wherein the first period of time is equal to 1 msec, and the second period of time is equal to 1.15 msec.

20. The method of claim 12, wherein the camera includes a chamber door, and the method further includes the step of:

preventing recording of photographic data on an exposed frame when the chamber door is open.

* * * * *

UNITED STATES PATENT AND TRADEMARK OFFICE
CERTIFICATE OF CORRECTION

PATENT NO. : 6,011,931
DATED : January 4, 2000
INVENTOR(S) : Tae-Kyung YUN et al.

It is certified that error appears in the above-identified patent and that said Letters Patent is hereby corrected as shown below:

Title Page, Item [57], in the Abstract, line 1, "apparatuses" should read --apparatus--.

Claim 4, col. 5, line 29, "claim 3" should read --claim 1--.

Claim 5, col. 5, line 40, "claim 3" should read --claim 1--.

Claim 6, col. 5, line 57, "signal;and" should read --signal; and--.

Claim 12, col. 6, line 28, after "perforation;", insert the line --determining whether the film is being advanced;--.

Claim 12, col. 6, line 29, "noise occurs in a sensing signal" should read --noise has occurred by determining if the level of a sensing signal--.

Claim 12, col. 6, line 30, after "perforation", insert --has changed--.

Signed and Sealed this

Sixth Day of February, 2001

*Attest:*

Q. TODD DICKINSON

*Attesting Officer*  *Director of Patents and Trademarks*